(12) United States Patent
Liard et al.

(10) Patent No.: US 11,331,827 B2
(45) Date of Patent: May 17, 2022

(54) METHOD FOR THE 3D-PRINTING OF MINERAL BINDER COMPOSITIONS

(71) Applicant: SIKA TECHNOLOGY AG, Baar (CH)

(72) Inventors: Maxime Liard, Zürich (CH); Didier Lootens, Küsnacht (CH); Marc Schumacher, Uster (CH)

(73) Assignee: SIKA TECHNOLOGY AG, Baar (CH)

( * ) Notice: Subject to any disclaimer, the term of this patent is extended or adjusted under 35 U.S.C. 154(b) by 120 days.

(21) Appl. No.: 16/631,013

(22) PCT Filed: Aug. 8, 2018

(86) PCT No.: PCT/EP2018/071451
§ 371 (c)(1),
(2) Date: Jan. 14, 2020

(87) PCT Pub. No.: WO2019/030255
PCT Pub. Date: Feb. 14, 2019

(65) Prior Publication Data
US 2020/0139579 A1    May 7, 2020

(30) Foreign Application Priority Data
Aug. 9, 2017   (EP) .................... 17185654

(51) Int. Cl.
| | | |
|---|---|---|
| *B28C 5/12* | (2006.01) |
| *B33Y 10/00* | (2015.01) |
| *B28B 1/00* | (2006.01) |
| *C04B 40/00* | (2006.01) |
| *B33Y 70/00* | (2020.01) |
| *B33Y 40/10* | (2020.01) |
| *C04B 22/14* | (2006.01) |
| *C04B 28/04* | (2006.01) |
| *C04B 103/12* | (2006.01) |
| *C04B 111/00* | (2006.01) |

(52) U.S. Cl.
CPC ............ *B28C 5/1292* (2013.01); *B28B 1/001* (2013.01); *B33Y 10/00* (2014.12); *B33Y 40/10* (2020.01); *B33Y 70/00* (2014.12); *C04B 22/148* (2013.01); *C04B 28/04* (2013.01); *C04B 40/0046* (2013.01); *C04B 2103/12* (2013.01); *C04B 2111/00181* (2013.01)

(58) Field of Classification Search
CPC . B28B 1/001; C04B 40/0046; C04B 2103/12; C04B 2103/14; C04B 2111/00181
See application file for complete search history.

(56) References Cited

U.S. PATENT DOCUMENTS

| | | | | |
|---|---|---|---|---|
| 2014/0252668 A1* | 9/2014 | Austin | ...................... | B28B 3/20 264/40.7 |
| 2016/0083304 A1 | 3/2016 | Mironets et al. | | |
| 2017/0365365 A1* | 12/2017 | White | ................. | E04G 21/0463 |
| 2019/0194072 A1* | 6/2019 | Esnault | ................. | C04B 22/124 |
| 2020/0039883 A1* | 2/2020 | Ohgi | ........................ | B22C 1/10 |

FOREIGN PATENT DOCUMENTS

| | | |
|---|---|---|
| CN | 1153098 A | 7/1997 |
| CN | 203357623 U | 12/2013 |
| CN | 104310918 A | 1/2015 |
| CN | 204354263 U | 5/2015 |
| CN | 204566322 U | 8/2015 |
| CN | 106988535 A | 7/2017 |
| DE | 29 47 913 A1 | 6/1981 |
| JP | H02-62205 A | 3/1990 |
| JP | 3080627 B2 | 8/2000 |
| WO | 2013/064826 A1 | 5/2013 |
| WO | 2016/164562 A1 | 10/2016 |
| WO | 2017/149040 A1 | 9/2017 |

OTHER PUBLICATIONS

Feb. 11, 2020 International Preliminary Report on Patentability issued in International Patent Application No. PCT/EP2018/071451.

Oct. 10, 2018 International Search Report issued in International Patent Application No. PCT/EP2018/071451.

\* cited by examiner

*Primary Examiner* — Mary Lynn F Theisen
(74) *Attorney, Agent, or Firm* — Oliff PLC

(57) ABSTRACT

In a method for the 3D-printing of hydrous mineral binder compositions, an aqueous accelerator is mixed with the binder composition in a continuous mixer. The method is very robust and makes it possible to quickly print even large moulded bodies having a uniform aesthetic surface and very good strength development properties.

16 Claims, 1 Drawing Sheet

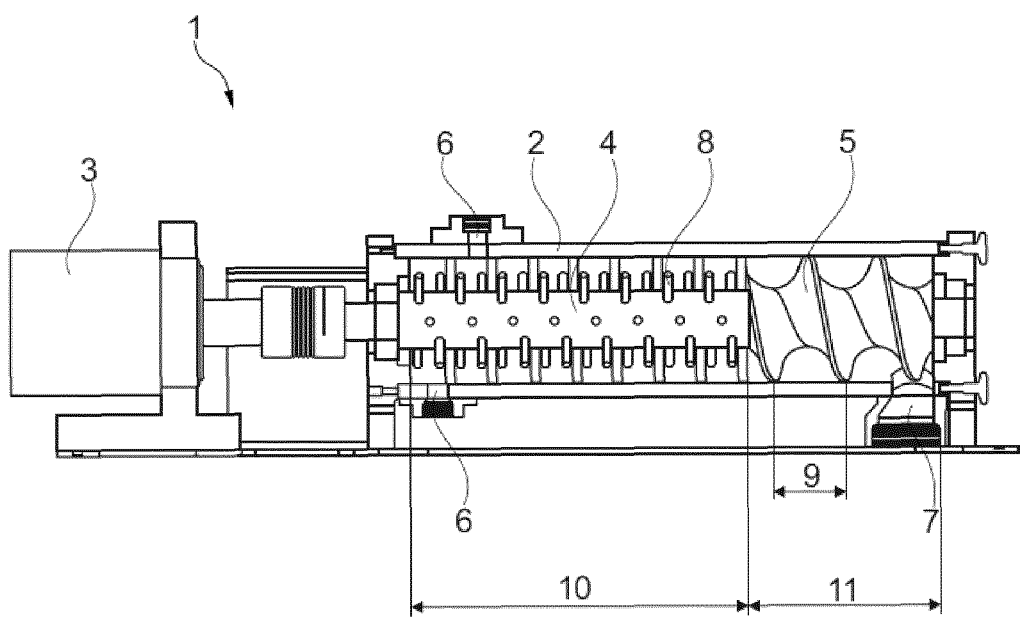

METHOD FOR THE 3D-PRINTING OF MINERAL BINDER COMPOSITIONS

TECHNICAL FIELD

The invention relates to a method for the 3D printing of mineral binder compositions and also to shaped bodies produced therewith.

PRIOR ART

In order to shape structural concrete, the concrete is typically poured into formwork and left to cure therein. Fabricating the formwork involves costs on materials and takes time; the shaping is limited; and formwork is often treated with environmentally burdensome forming oils.

The problem of the high costs and limited shaping associated with the use of formwork has been partially resolved in the case of thermoplastic polymers, for example, through the use of 3D printing methods.

The 3D printing method is also referred to as freeform construction. Typical materials for 3D printing are thermoplastic polymers, which are heated and applied, in the plastic state, in spots or layers. The material is usually applied by way of a movable printing head which is under the control of a computer. Cooling gives the polymers sufficient strength to maintain the shape imparted.

The 3D printing of building materials, especially of cementitious materials, is much more difficult, however. Cement attains its strength through reaction with water in a chemical process called cement hydration. The time from the mixing of the cement with water to the attainment of sufficient strength for self-support is typically in the region of several hours. 3D printing, however, requires rapid development of strength or at least good shape stability on the part of the material applied.

Certain users have therefore employed concrete or mortar mixtures which contain very little water and are therefore very stiff. Such mixtures can be conveyed only over short distances and with high pumping pressure, and the shaped body produced in this way often contains defect sites, such as air inclusions, for example, is visually nonuniform, and/or exhibits a poor bond between the individual layers applied.

A further problem is the transport of the mortar or concrete mixture to the printing facility, especially for the printing of relatively large structures. Only mixtures having good conveying properties can be conveyed over a large distance from the mixer to the printing head. Mixtures of that kind, however, are typically not self-supporting and are therefore not suitable for printing.

CN 203357623 describes a method with which a part of the water is withdrawn by vacuum from the concrete shortly before it is applied, to give a stiff, self-supporting material. Such installations are expensive, complicated, and undesirably increase the weight of the printing head, and the resultant material is often not uniform, with the possible consequences both of visual deficiencies and of cracking.

WO 2013/064826 describes a method for the layer-by-layer application of a cementitious material. The addition is described of an accelerator which is added via a separate inlet, mounted in the vicinity of the nozzle with which the cementitious material is delivered, without the use of a mixing device for mixing the accelerator with the cementitious material. The arrangement described is unsuitable for effective mixing of the cementitious material with the accelerator.

CN 104310918 describes a cementitious mixture for 3D printing, where a premix of accelerator and retarder is produced and this mixture is then added to the dry cementitious mixture before mixing takes place with water. Cementitious mixtures which already contain the accelerator when they are mixed with water are very difficult to control in their curing behavior, even if they include a retarder.

JP H02 62205 A describes a device for continuous stirring, mixing, and delivery of a hydraulic material which is mixed with an accelerator. The material delivered is introduced into fixed or movable formwork.

DE 29 47 913 A1 describes a machine for the spraying of wet concrete. The concrete conveyed in this case is dry, and water and admixtures, such as solidification accelerators, are not added and mixed in until immediately ahead of the spraying hose with spraying nozzle. By means of compressed air, the concrete is conveyed from the spraying nozzle and sprayed onto the wall that is to be coated.

JP 3 080627 B2 describes a device for the continuous mixing of aggregates, curing agent, and resin. In this case the curing agent is mixed first with the aggregates, and the resin is mixed in subsequently.

CN 106 988 535 A describes a 3D printing head in which printing material and additive are mixed.

CN 204 354 263 U describes a device for the mixing and extruding of multicomponent Bingham fluids.

The existing methods do not provide a satisfactory solution to the problem; the manufacturing rate is low, the production costs are high, the visual aspect is deficient, and/or the strength of the shaped body is inadequate.

There is therefore a need for improved methods for the 3D printing of mineral binder compositions, these methods as far as possible overcoming the disadvantages identified above.

SUMMARY OF THE INVENTION

It is an object of the present invention, therefore, to provide an improved method for the 3D printing of mineral binder compositions. The method is intended in particular to enable efficient, reliable, and extremely rapid application of the mineral binder composition. At the same time, where possible, the layers applied are to be of high quality in terms of strength development and visual uniformity. Surprisingly this object is achieved by a method as described herein.

The effect of separating the steps of providing the hydrous mineral binder composition and of mixing the aqueous accelerator with the hydrous binder composition gives the method great flexibility. The hydrous mineral binder composition remains readily workable over a relatively long period, because the aqueous accelerator is mixed in only with the continuous mixer. This avoids a high pressure in the conveying device, especially in a hose, between pump and continuous mixer, and also prevents premature stiffening or hardening of the binder composition and hence the possible blocking of the printing device, especially in the case of unplanned waiting times. Moreover, the site where the hydrous binder composition is provided may be physically remote from the site of application, this being an advantage on account of the often tight space requirements at the printing location.

Through the use of the continuous mixer having at least one dynamic mixing element, the mixing of the aqueous accelerator with the hydrous binder composition is very good and effective, and so the layers applied cure uniformly and rapidly.

Surprisingly, the delivery of material from the continuous mixer is very constant, this being the case even if the pumping power when conveying the hydrous mineral binder composition to the mixer is subject to fluctuations, as often occurs with usual concrete or mortar pumps.

The quality of the accelerated mineral binder composition emerging from the mixer is also very constant, even if the quality of the hydrous mineral binder composition is subject to fluctuations. These fluctuations may originate from fluctuations in quality, especially in the particle size distribution of the fillers, or fluctuations in the composition of the mineral binder and/or slight deviations in the metering of the constituents. Moreover, after the continuous mixer, the accelerated binder composition is devoid of coarse air inclusions and is very uniform, and the shape of the applied layers is very uniform and visually appealing without defect sites.

Through the method it is possible to apply the accelerated binder composition reliably, rapidly, and in uniform layers, thereby enabling the production of large shaped bodies easily, with minimum time involved, and with esthetic appeal.

Other aspects of the invention are subjects of further independent claims. Particularly preferred embodiments of the invention are subjects of the dependent claims.

WAYS OF EXECUTING THE INVENTION

A subject of the invention is a method for applying a mineral binder composition by 3D printing, comprising the steps of
  providing a hydrous mineral binder composition,
  feeding the hydrous mineral binder composition, especially by a pump, to a continuous mixer comprising
    a mixing region with at least one dynamic mixing element and at least one inlet,
    a conveying region connected to the mixing region and comprising at least one conveying device and an outlet,
  the hydrous mineral binder composition being conveyed through the at least one inlet into the mixing region,
  feeding at least one aqueous accelerator for the setting of the hydrous mineral binder composition into the mixing region of the continuous mixer,
  mixing the at least one aqueous accelerator with the hydrous binder composition in the mixing region of the continuous mixer to give an accelerated binder composition,
  conveying the accelerated binder composition by the conveying device to the outlet, and
  applying the accelerated binder composition layer by layer, in particular by way of a movable printing head.

3D printing is a formwork-free shaping method. The material is applied layer by layer to generate three-dimensional objects. This layer-by-layer construction takes place under computer control from one or more liquid or solid materials according to specified masses and shapes.

"3D printing", also referred to as "freeform construction", is understood in the present document to refer to a method for producing shaped bodies by applying a formable material in a plurality of layers or relatively small portions, where a solid, shaped body is formed after curing. The layers in this case are not applied by spraying.

A "mineral binder" is understood in the present document to refer in particular to a binder which reacts in the presence of water, in a hydration reaction, to form solid hydrates or hydrate phases.

A "mineral binder composition" is understood in the present document to refer, correspondingly, to a composition comprising at least one mineral binder. This composition includes in particular the binder, fillers, and optionally one or more admixtures.

A "hydrous mineral binder composition" is understood in the present document to refer to a mineral binder composition mixed with water, the composition being more particularly in fluid form.

A "cementitious binder" in the present document refers in particular to a binder having a cement clinker fraction of at least 5 wt %, more particularly at least 20 wt %, preferably at least 35 wt %, especially at least 65 wt %, with a maximum content of 100 wt %. The cement clinker preferably comprises a Portland cement clinker, a calcium aluminate clinker, or a calcium sulfoaluminate clinker. Cement clinker in the present document is a reference more particularly to ground cement clinker.

"Mortar" or "concrete" refers in the present document to aqueous dispersions which comprise at least one cement and at least one mineral filler and which are capable, after the hydration of the cement, of curing in a solid shape. "Mortar" in this context refers to dispersions comprising fillers having particle sizes of up to at most about 8 mm, and "concrete" to dispersions which also include fillers having particle sizes above 8 mm.

"Fresh mortar" or "fresh concrete" in the present document refers to a mortar or concrete immediately after the mixing of the constituents with water.

"Self-supporting" is understood in the present document to refer to a physical property whereby the material after shaping changes individual dimensions by not more than 10% in the absence of any external force. This means that an extruded strand with a square cross section and a side length of 10 mm has, after curing, a height of 9 to 10 mm and a width of 10 to 11 mm.

A "dynamic mixing element" in the present document refers to a component which comprises movable elements and is suitable for mixing solid and/or liquid constituents.

In the method, a hydrous mineral binder composition is provided. This composition comprises at least one mineral binder. A suitable mineral binder is, in particular, a mineral binder which reacts in the presence of water, in a hydration reaction, to form solid hydrates or hydrate phases. This may in particular be a hydraulic binder, which can be hardened with water even under water, such as especially cement or hydraulic lime, or a latent hydraulic binder, which sets with water under the action of admixtures, such a binder more particularly being slag, or a pozzolanic binder, such as, in particular, fly ash, or a nonhydraulic binder, such as, in particular, gypsum in the form of anhydrite or hemihydrate gypsum.

The mineral binder is preferably selected from the group consisting of cement, gypsum, burnt lime, slag, and fly ash, and mixtures thereof.

The mineral binder composition preferably comprises at least one hydraulic binder, preferably a cementitious binder.

The hydraulic binder is preferably selected from the group consisting of Portland cement, calcium aluminate cement, calcium sulfoaluminate cement, and mixtures thereof.

The cement used may be any available cement type or a mixture of two or more cement types, examples being the cements classified under DIN EN 197-1: Portland cement (CEM I), Portland composite cement (CEM II), blast furnace slag cement (CEM III), pozzolanic cement (CEM IV), and composite cement (CEM V). Cements produced according to an alternative standard, such as the ASTM standard or the Indian standard, for example, are of course equally suitable. Particularly preferred is a cement according to DIN EN 197-1, a calcium sulfoaluminate cement, a calcium aluminate cement, or mixtures thereof, optionally in a mixture with calcium sulfate.

The most preferred is Portland cement or a cement including Portland cement according to DIN EN 197-1. Portland cement is particularly readily available and allows mortars to have good properties.

Also especially suitable are mixtures of cement, calcium aluminate cement, and calcium sulfate, or mixtures of cement and calcium sulfoaluminate cement. Such binder mixtures allow short setting times and high early strengths.

As a proportion of the overall mineral binder, the hydraulic binder is preferably at least 5 wt %, especially at least 20 wt %, more preferably at least 35 wt %, in particular at least 65 wt %, with a maximum fraction of 100 wt %. According to a further advantageous embodiment, the mineral binder consists to an extent of 95 to 100 wt % of hydraulic binder, more particularly of cement clinker.

It may also be advantageous for the binder composition to comprise other binders in addition to or instead of a hydraulic binder. These other binders are, in particular, latent hydraulic binders and/or pozzolanic binders. Particularly suitable latent hydraulic and/or pozzolanic binders are slag, foundry sand, fly ash and/or silica fume.

The mineral binder composition preferably further comprises fillers, especially mineral fillers. Fillers are chemically inert, solid, particulate materials and are available in various shapes, sizes and as different materials, varying from extremely fine particles of sand to large coarse stones. All fillers typically employed for concrete and mortar are suitable in principle. Examples of particularly suitable fillers are rock particle size fractions, gravel, sand, especially silica sand and limestone sand, comminuted stones, calcined pebbles or lightweight fillers such as expanded clay, expanded glass, foamed glass, pumice, perlite, and vermiculite. Other advantageous fillers are calcium carbonate, aluminum oxide, amorphous silica (silica fume), or crystalline silica (quartz flour).

The particle size is guided by the application and is situated in the range from 0.1 µm to 32 mm or more. Preference is given to mixing different particle sizes in order to provide optimum establishment of the properties of the hydrous mineral binder composition. Fillers composed of different materials can also be mixed. The particle size may be determined by means of sieve analysis.

Preferred fillers are those having particle sizes of not more than 8 mm, more preferably not more than 5 mm, more preferably still not more than 3.5 mm, most preferably not more than 2.2 mm.

The mineral binder composition preferably comprises fillers of which at least 30 wt %, more preferably at least 40 wt %, most preferably at least 50 wt % are smaller than 2 mm, preferably smaller than 1 mm, more preferably smaller than 0.5 mm, based on a total amount of 100 wt % of all fillers in the binder composition. Suitable fillers of low particle size are, in particular, fine silica sands or calcium carbonate powders.

Binder compositions having such particle sizes are readily conveyable, can be mixed well with the aqueous accelerator in the continuous mixer, and result in a very uniform surface after application.

There are specific applications in which fillers having particle sizes of up to 32 mm may also be used, more preferably up to 20 mm, most preferably up to 16 mm.

The hydrous mineral binder composition may optionally include at least one additive, as for example a concrete admixture and/or a mortar admixture and/or process chemicals. The at least one additive more particularly comprises a defoamer, a wetting agent, a die, a preservative, a plasticizer, a retarder, further accelerators, a polymer, an air entrainer, a rheological assistant, a viscosity modifier, a pumping assistant, a shrinkage reducer, or a corrosion inhibitor, or combinations thereof.

The use of a plasticizer or superplasticizer in the hydrous mineral binder composition enhances the fluidity of the composition. Examples of suitable plasticizers include lignosulfonates, sulfonated naphthalene-formaldehyde condensates, sulfonated melamine-formaldehyde condensates, sulfonated vinylcopolymers, polyalkylene glycols having phosphonate groups, polyalkylene glycols having phosphate groups, polycarboxylates or polycarboxylate ethers, or mixtures of the stated plasticizers; polycarboxylate ethers are understood to comprise comb polymers having anionic groups on the polymer backbone and having polyalkylene oxide side chains, the anionic groups being selected in particular from carboxylate groups, sulfonate groups, phosphonate groups, or phosphate groups.

The plasticizer preferably comprises a polycarboxylate ether. More particularly, the plasticizer is a comb polymer comprising a polycarboxylate backbone with polyalkylene oxide side chains bonded to it, especially polyethylene oxide side chains. These side chains are bonded to the polycarboxylate backbone in particular by way of ester, ether, imide and/or amide groups. Such comb polymers are also sold commercially by Sika Schweiz AG under the tradename range Sika® ViscoCrete®.

The use of hardening retarders may be advantageous since it prolongs the working time of the hydrous binder composition. The hardening retarder is preferably a hydroxycarboxylic acid, more particular tartaric acid, citric acid or gluconic acid; a sugar, more particularly sucrose; a phosphate or a phosphonate; or salts thereof or mixtures of these.

The use of rheological assistants may be advantageous since it allows the cohesion of the composition to be improved. Preferred rheological assistants are natural or modified polysaccharides, especially cellulose ethers or cellulose esters, starch, modified starch, xanthan, welan, diutan or carrageenan.

With more particular preference the rheological assistant is methylcellulose, hydroxyethylcellulose, methyl-hydroxyethylcellulose, or xanthan gum, or mixtures thereof.

The use of pumping assistants may be advantageous because the internal cohesion, the smoothness, and the lubricity of the composition are enhanced. The pumping assistant preferably comprises water-soluble polymers, such as, in particular, SikaPump® from Sika.

In one preferred embodiment, the binder composition comprises a polymer, particularly a water-insoluble, film-forming polymer. Film-forming polymers, when present as a dispersion in a liquid, are able to coagulate to form films when the dispersion dries. The polymer is preferably a homopolymer or copolymer of acrylic esters, a copolymer of styrene and butadiene, a copolymer of styrene and acrylic esters, or a homopolymer or copolymer of vinyl acetate.

Aqueous dispersions of such polymers are available commercially, under the tradenames Acronal® (BASF), Primal™ (DOW), or Revacryl (Synthomer), for example.

It is, however, also possible to use redispersible polymer powders which form dispersions when mixed with water.

Polymer powders of these kinds are available commercially, under the tradenames Vinnapas® (Wacker) or Elotex® (AkzoNobel), for example.

The mineral binder composition in particular comprises a hydraulic binder composition, preferably a mortar or concrete composition, or consists of such a composition.

The hydrous mineral binder composition is provided preferably by mixing of a dry mineral binder composition with water. The water may further comprise additives in dissolved or dispersed form. The additives, however, can also be mixed with the hydrous mineral binder composition after the addition of the water, as solids or in dissolved form.

The provision and production of such mixtures is familiar to the person skilled in the art from the provision of mortars or concrete mixtures.

The production may take place in particular in a batch mixer or else in a continuous mixer.

The hydrous mineral binder composition is preferably a fresh mortar having a slump of at least 170 mm, preferably of 200 to 380 mm, more preferably of 250 to 350 mm, determined according to DIN EN 1015-3 after the raising of the slump cone without lifts of the flow table.

More preferably the hydrous mineral binder composition is a fresh concrete having a slump of at least 100 mm, preferably 200 to 295 mm, most preferably 250 to 280 mm, determined according to DIN EN 12350-2.

Hydrous mineral binder compositions with a consistency of this kind are particularly easy to pump and convey and can be mixed very well with the aqueous accelerator in the continuous mixer.

The hydrous mineral binder composition preferably comprises the following constituents:
- 15-50 wt % of Portland cement,
- 40-65 wt % of fillers,
- 0.01-5 wt % of additives, and
- 8-25 wt % of water, based on 100 wt % of hydrous mineral binder composition.

More preferably, the hydrous mineral binder composition comprises the following constituents:
- 10-30 wt % of Portland cement,
- 5-20 wt % of calcium aluminate cement,
- 0-4 wt % of calcium sulfate, preferably calcium sulfate hemihydrate,
- 40-65 wt % of fillers,
- 0.1-10 wt % of additives, and
- 8-25 wt % of water, based on 100 wt % of hydrous mineral binder composition.

Especially preferably, the hydrous mineral binder composition comprises the following constituents:
- 20-40 wt % of Portland cement, especially Portland cement CEM I,
- 40-65 wt % of fillers with a particle size of not more than 2.2 mm, with preferably at least 50 wt % of the fillers having a particle size of below 0.5 mm,
- 0-2 wt % of superplasticizer, more particularly a polycarboxylate ether,
- 0-8 wt % of water-insoluble polymer,
- 0-2 wt % of thickeners,
- 0-1 wt % of defoamers,
- 0-5 wt % of further additives, and
- 8-22 wt % of water, based on 100 wt % of hydrous mineral binder composition.

A further especially preferred hydrous mineral binder composition comprises the following constituents:
- 15-28 wt % of Portland cement, especially Portland cement CEM I,
- 7-15 wt % of calcium aluminate cement or calcium sulfoaluminate cement,
- 0-4 wt % of calcium sulfate hemihydrate,
- 40-65 wt % of fillers with a particle size of not more than 2.2 mm, with preferably at least 50 wt % of the fillers having a particle size of below 0.5 mm,
- 0.1-5 wt % of retarders, comprising, in particular, tartaric acid and/or citric acid and/or salts thereof,
- 0-2 wt % of superplasticizer, more particularly a polycarboxylate ether,
- 0-2 wt % of thickeners,
- 0-1 wt % of defoamers,
- 0-5 wt % of further additives, and
- 8-24 wt % of water, based on 100 wt % of hydrous mineral binder composition.

The hydrous mineral binder composition is fed, preferably by means of a pump and a conveying line, in particular a hose, from the site of the providing to the continuous mixer. The hydrous mineral binder composition preferably has good conveyability. Good conveyability is important for 3D printing, being a prerequisite for uniform application. Especially for the printing of large shaped parts, the length of a conveying line between pump and continuous mixer may reach up to 50 m or more, possibly resulting in high pressure in the conveying line. A high pressure, especially in a hose, is disadvantageous in that it greatly stresses the material, which if overloaded may burst. Compositions with good conveyability are able to prevent an excessive buildup of pressure. The pressure in the conveying line between the pump and continuous mixer is preferably below 40 bar, more preferably below 25 bar.

Before the hydrous mineral binder composition is fed to the continuous mixer, a preferred possibility is to convey a so-called "lubricating mix" through the conveying line and printing equipment. The "lubrication mix" is not applied; typically it is disposed of into a waste container. Suitable lubricating mixes are, in particular, aqueous solutions of an organic polymer, especially SikaPump® Start 1, or a highly mobile mixture of water and cement and/or fine filler, especially limestone. With preference, first an aqueous polymer solution and then a highly mobile mixture of water and cement and/or fine filler are pumped through the conveying line and printing equipment, before the hydrous mineral binder composition is conveyed.

The hydrous mineral binder composition is mixed with an aqueous accelerator. The accelerator is advantageously a solidification accelerator and/or a hardening accelerator, or a mixture of these.

There are a multiplicity of substances known to a person skilled in the art that can be used as accelerators.

The aqueous accelerator preferably comprises at least one compound selected from the group consisting of amino alcohols, alkali metal and alkaline earth metal nitrates, alkali metal and alkaline earth metal nitrites, alkali metal and alkaline earth metal thiocyanates, alkali metal and alkaline earth metal halides, alkali metal and alkaline earth metal carbonates, glycerol, glycerol derivatives, glycols, glycol derivatives, aluminum salts, aluminum hydroxides, alkali metal and alkaline earth metal hydroxides, alkali metal and alkaline earth metal silicates, alkali metal and alkaline earth metal oxides, crystallization nuclei, especially calcium silicate hydrate compounds in finely divided form, and mixtures thereof.

With particular preference the aqueous accelerator comprises an aluminum salt or aluminum hydroxide, especially sodium aluminate, potassium aluminate, aluminum sulfate, aluminum hydroxysulfate, aluminum hydroxide, or mixtures thereof.

Aluminum compounds of these kinds accelerate the setting of a hydraulic binder especially well.

With preference it is also possible for two or more aqueous accelerators differing in their composition to be added together or separately from one another.

In this way, for example, there is the possibility of flexible adaptation to a very wide variety of different applications.

The metering of the accelerator is dependent on the constitution of the hydrous mineral binder composition, especially on the nature and amount of the hydraulic binder, the nature and amount of the retarder, if present, and the amount of water, and also on the ambient temperature and the temperature of the hydrous binder composition.

The accelerator is preferably metered in an amount such that the accelerated composition remains readily shapable for several seconds to several minutes. This allows the layers to be applied uniformly, said layers developing a good cohesion, and the surface of the shaped body produced can if desired be subsequently after treated—smoothed, for example.

If the accelerator is metered in an insufficient amount, then the accelerated binder composition applied in layers is late in obtaining the necessary strength to allow the application of a further layer thereto. As a result, the printing rate has to be severely reduced, or waiting times must be allowed, which delays the completion of the shaped piece.

If the accelerator is metered at too high a level, a possible occurrence is for the accelerated mineral binder composition to harden while still within the mixer, at least partially, and this can lead to blocking of the mixer, or else the partial hardening occurs shortly after the mixer before or during application, with the possible consequence that the layer applied is non uniform and crumbly and that the bond to any subsequently applied layer is deficient.

The mineral binder composition is mixed with the aqueous accelerator not until shortly before the application of the accelerated mineral binder composition, preferably.

The aqueous accelerator is metered preferably in an amount in the range from 0.3 to 8 parts by weight, more preferably 0.4 to 5 parts by weight, more preferably still 0.5 to 2.5 parts by weight, calculated as solid without water, based on 100 parts by weight of mineral binder.

Besides the accelerator, there are further additives which may be mixed with the hydrous mineral binder composition using the continuous mixer.

The at least one aqueous accelerator and any further additives are metered preferably via metering devices in the region of the continuous mixer.

The hydrous mineral binder composition and the aqueous accelerator, and, optionally, further additives, may be conveyed to the mixer by way, for example, of one or more conveying devices, especially pumps and conveying lines. These conveying devices can be controlled in particular via a control unit, especially independently of one another.

The continuous mixer is preferably mounted on a movable printing head.

The printing head preferably comprises a delivery nozzle for the layer-by-layer application of the accelerated mineral binder composition.

The continuous mixer is mounted on the movable printing head preferably in direct association with this delivery nozzle. As a result, the development of strength by the mineral binder over time can be tailored. In particular, application as a whole can be greatly accelerated through addition of an accelerator.

The dimensions and the weight of the continuous mixer are preferably adapted to the size of the printing head. It is advantageous, accordingly, if the mixer in a printing facility for relatively small shaped parts is also smaller than the mixer in a printing facility for large shaped parts such as house parts or walls.

The continuous mixer may thus have a weight of 20 to 100 kg or more for the printing of shaped parts in an order of magnitude of several meters, or a weight of about 1 to 20 kg for the printing of shaped parts in an order of magnitude of about 5 cm to 1 m.

With the continuous mixer, the accelerator is mixed very rapidly, efficiently, and uniformly into the mineral binder composition.

This is important so that the composition on layer-by-layer application is uniform and cures evenly and rapidly.

In one exemplary embodiment, the mixer comprises more than one inlet, especially two, three, four, five, six, seven, or eight inlets.

An advantage of providing a plurality of inlets is that it allows constituents, especially those which react with one another or are not stable when stored together, to be fed to the mixing region of the mixer through separate inlets.

Particularly suitable mixers are described in the international application having the application number PCT/EP2017/054824.

The mixing of the hydrous mineral binder composition with the aqueous accelerator in the mixing region takes place preferably at a stirring shaft speed of 500 to 3000 revolutions per minute, more preferably of 650 to 2500 revolutions per minute, more preferably still of 800 to 2000 revolutions per minute, most preferably of 1000 to 1500 revolutions per minute.

Mixing at high speed produces a rapid and efficient mixing of the binder composition with the accelerator, this being especially important since a poorly distributed accelerator in the aqueous mineral binder composition leads very rapidly, locally, to very high viscosity and/or to hardening of the binder, with the possible consequences of blocking and/or damaging of the mixer. If, on the other hand, the accelerator is mixed very rapidly and efficiently with the aqueous mineral binder composition, then the increase in viscosity, and the hardening, take place uniformly and controllably, without blocking of the mixer, and the accelerated mineral binder composition can be applied without disruptions.

The residence time of the hydrous mineral binder composition in the mixer is preferably less than 10 s, more preferably less than 7 s, very preferably less than 4 s.

The mean residence time of the binder composition in the mixing device is the average period of time for which a particle resides in the mixing device, from the inlet to the outlet.

The continuous mixer, especially in the preferred form, produces very good distribution of the accelerator in the binder composition, leading to uniform curing of the accelerated binder composition without lumps being formed or the join between the constituents being poor.

The use of the aqueous accelerator in combination with the deployment of the continuous mixer makes it possible, surprisingly, to compensate the customary fluctuations in the constitution of the hydrous mineral binder composition, such as fluctuations in water content, in the particle size distribution of the fillers, or in cement quality, and consequently the properties of the accelerated binder composition are highly consistent and the method becomes very robust, this being an exceptional advantage.

The accelerated binder composition is highly deformable immediately after the accelerator has been mixed in, and can be applied in uniform layers using the printing head. These layers are self-supporting after a short time, and exhibit rapid development of strength. Subsequent layers can therefore be applied at short intervals and to a height of several centimeters to the underlying layers, without problems.

A further subject of the invention is therefore an accelerated binder composition, obtained from the method described, which, immediately after the mixing of the hydrous mineral binder composition with the aqueous accelerator, for at least 10 seconds has a penetrometer resistance of not more than 0.03 MPa, and after at most 10 minutes, preferably after at most 6 minutes, more preferably still after at most 4 minutes has a penetrometer resistance of more than 0.03 MPa, the penetrometer resistance being determined at 21° C. with a penetrometer according to ASTM C-403 with a needle of 1 mm diameter.

The accelerated binder composition is applied preferably by way of a movable printing head.

The printing head in particular possesses at least one delivery aperture, which may be identical to the outlet of the continuous mixer, through which the curable material can be delivered.

The high sag resistance of the applied layers makes it unnecessary for formwork panels to be carried along at the delivery aperture of the printing head.

In the case of specific applications, however, it may be advantageous for formwork panels to be carried along directly at the delivery aperture.

At the delivery aperture there is preferably a delivery nozzle which shapes the material delivered. There is no restriction on the shape, though it ought to be adapted to the maximum particle size of the material to be delivered.

The delivery nozzle preferably has a rectangular, square or round shape. There may be further shaping elements mounted in the delivery nozzle.

In one preferred variant, the printing head can be moved in one, two or three spatial directions. Particularly preferred is a printing head which can be moved in three spatial directions. This allows shaped bodies of virtually any desired shape to be produced in a particularly simple way.

The movement of the printing head may be realized in particular by the mounting of the printing head on a conventional robotic arm which can be moved in one, two or three spatial directions.

The printing head is preferably located on a 3-axis portal robot system. This allows the rapid printing even of large shaped bodies with flexible shaping.

Another possibility is to realize movements in one, two or three spatial directions through corresponding movements of the building space region. The building space region in this context is the region—a surface, for example—on which the shaped body is being constructed.

The accelerated mineral binder composition when it has been provided and applied at 21° C., 8 hours, more preferably 4 hours, most preferably 1 hour after mixing with the aqueous accelerator has a compressive strength of at least 10 MPa, the compressive strength being determined according to EN 196-1.

Shaped bodies can be produced surprisingly quickly by layer-by-layer application with the method of the invention.

The height of an individual layer, measured typically in a direction substantially perpendicular to the planes formed by individual layers, more particularly in a vertical direction, is preferably 1 mm to 200 mm, more preferably 5 mm to 100 mm, more particularly 10 mm to 50 mm.

The total height of the shaped body, or the thickness of all the individual layers of the shaped body taken together, is preferably 0.01 m to 100 m or more, more preferably 0.1 m to 80 m, more preferably still 0.3 m to 30 m, more particularly 0.5 m to 10 m. This is especially the case if the mineral binder composition comprises or consists of a mortar or concrete composition.

While it is still workable, the surface of the shaped body may, using suitable tools, be smoothed, corrected or specially deformed. This may take place as part of the mechanical fabrication, or manually as a separate step. The surface may also be provided with a functional or decorative coating, such as with a paint, for example.

While it is still workable, the shaped body may also be cut using suitable tools. Thus it is possible for holes, especially for window openings, door openings, conduit passages, or else cuts, especially for later working steps, to be made in the shaped body.

The shaped body produced with the method of the invention may have almost any desired form. The shaped body is, for example, an edifice, a fabricated part for an edifice, a construction element, a masonry construction, a bridge, a column, a decorative element such as, for example, artificial hills, reefs or sculptures, a pond, a well, or a trough. The shaped body in this case may represent a solid shape or a hollow shape, with or without a base.

The shaped body may be produced directly on site and no longer moved after the application. Alternatively the shaped body may be produced at another site, especially in a plant. This is done preferably on a base to which the shaped body does not attach. After it has cured, the shape body can be transported to the desired site.

A further subject of the present invention is a shaped body produced by the method of the invention.

EXAMPLES

Exemplary embodiments are given below which are intended to elucidate the above-described invention in more detail. The invention is of course not limited to these exemplary embodiments described.

Materials Used

Sigunit®-L53 AF (CC) is an aqueous, alkali-free accelerator based on aluminum sulfate, with a solids content of around 52 wt %, available from Sika.

Betoflow® D is a fine calcium carbonate powder of 1-5 µm particle size, available from Omya.

Nekafill® 15 is a finely ground limestone, available from Kalkfabrik Netstal. Sika® ViscoCrete®-3088 S is an aqueous retarder/plasticizer based on a polycarboxylate ether, available from Sika.

Carbowet® 4000 is a defoamer, available from Air Products Chemicals Europe. SikaPump® is a pumping assistant comprising water-soluble polymers, available from Sika.

Description of the Printing Process

A 3-axis portal robot was used for 3D printing.

The portal robot was equipped with a printing head which could be moved in all three spatial directions. Integrated in the printing head was a dynamic continuous mixer with a weight of around 60 kg. The construction of the mixer was as shown in FIG. 1. It had an inlet for the mortar, an inlet for the aqueous accelerator, and an outlet for the accelerated mortar. The drum contained the mixing region and the conveying region, and had a diameter of about 100 mm. In the mixing region there was a stirring shaft with pegs, and in the conveying region there was a screw conveyor having six turns, and the stirring shaft and the screw conveyor were arranged on the same axis. The inlets were positioned in the region of the stirring shaft, and the outlet was positioned at the end of the screw conveyor. Mounted on the outlet was a circular nozzle having a diameter of 40 mm.

The fresh mortar was provided using a forced mixer. In this mixer, the dry constituents of the mortar were first mixed for one minute, and then the water and the aqueous constituents were added, with thorough mixing over the course of three minutes.

Using a screw pump, the mortar was conveyed through a hose having an internal diameter of 35 mm and a total length of 32 m, to the first inlet of the mixer.

The aqueous accelerator was conveyed from a reservoir tank, with a pump, through a hose to the second inlet of the mixer.

In the mixer, the mortar mixture was mixed continuously with the aqueous accelerator, and the accelerated mortar was applied in layers via the outlet and the nozzle of the printing head.

The conveying of the mortar mixture, the metering of the accelerator, the rotational velocity of the continuous mixer, and the movement of the printing head were controlled via a computer program.

Ahead of the first mortar mixture, a mixture of one pouch of SikaPump® Start 1 and 30 l of water and subsequently a mixture of 15 kg of Nekafill® 15 and 15 kg of water were pumped through the printing facility—that is, through the hose, the mixer, and the printing head—into a waste pan.

The temperature of the hydrous mortar mixture was about 19° C., that of the ambient air about 21° C.

Inventive Example 1

A fresh mortar was prepared from 120 kg of Portland cement CEM I 52.5, 92 kg of 0-1 mm silica sand with a moisture content of 2.2 wt %, 33 kg of Betoflow®-D, 80 kg of Nekafill® 15, 1.1 kg of Sika® Viscocrete®-3088 S, 0.004 kg of Carbowet® 4000 and 56.8 kg of water.

The fresh mortar had a slump of 260 mm, measured according to DIN EN 1015-3 after the raising of the slump cone without lifts of the flow table.

The fresh mortar was conveyed to the continuous mixer at a conveying rate of about 33 kg/min.

With a conveying rate of about 350-400 ml/min, prediluted Sigunit®-L53 AF (CC) (75 wt % Sigunit®-L53 AF (CC) and 25 wt % water) was conveyed as accelerator to the continuous mixer.

The fresh mortar and the accelerator were mixed in the mixer continuously at about 1200 revolutions of the stirring shaft per minute. The accelerated mortar mixture was applied with the printing head to a plastic sheet placed on a concrete base in layers of about 50 mm width and 10 mm height. The speed of the printing head in this case was 20-30 meters per minute. In a plurality of layers, a conical, elongate, contoured hollow frame was printed in the form of a bath tub open at the bottom and about 800 mm in height. The longitudinal sides were parallel, the latitudinal sides were rounded, and the slope of the walls on the latitudinal sides was about 30°. The completed shaped body had an upper and lower width of about 590 mm, a lower length of about 720 mm and an upper length of about 1670 mm. The printing of the shaped body took about 15 minutes. The height of the lower layers and of the upper layers differed by not more than 5%. The printed shaped body had a corrugated, very regular surface without visible defect sites. Throughout the printing operation, the pressure in the hose for conveying fresh mortar was in the 3-5 bar range.

About 16 hours after the application of the final layer, the hollow body was raised, using carrying belts and a crane, onto a transport pallet, without any damage to the printed shaped body.

After about four days, the shaped body was destroyed using a heavy hammer, and the fragments were analyzed optically. The fracture faces showed a uniform surface, without air inclusions or defect sites. The fracture faces did not show any preferred orientation, meaning that the connection of the applied layers to one another was just as good as the connection within the same layer.

Comparative Example 1

Inventive example 1 was repeated, but without the addition of an accelerator. The mortar flowed out of the delivery nozzle and could not be applied in layers. The experiment was thereupon discontinued.

Comparative Example 2

Inventive example 1 was repeated, but without the use of a mixer for mixing the accelerator with the mortar mixture. The metering line for the accelerator was mounted in such a way that the accelerator was metered a short way ahead of the delivery nozzle, in the middle of the hose in which the mortar was conveyed. The accelerator metering was the same as in inventive example 1. The mortar delivered from the delivery nozzle was very nonuniform. It was not possible, using this mortar, to build up a plurality of overlying layers.

Comparative Example 3

Inventive example 1 was repeated, but the aqueous accelerator was added to the aqueous mortar mixture directly after the provision of said mixture, and mixed in. After a few seconds, the mortar began to stiffen, and could no longer be conveyed to the printing head.

BRIEF DESCRIPTION OF THE DRAWINGS

Exemplary embodiments of the invention are elucidated in more detail below with reference to the drawing.

FIG. 1 shows: a schematic illustration of an exemplary mixer.

Only those elements essential to the direct understanding of the invention have been shown.

FIG. 1 illustrates an exemplary mixer 1. The mixer 1 has a drive 3 and a drum 2 with a mixing region 10 and a conveying region 11. In the mixing region there is a stirring shaft 4 and two inlets 6; in the conveying region 11 there is a conveying device 5 and an outlet 7.

In this case, the conveying device 5 is arranged directly adjoining the stirring shaft 4, such that the accelerated mineral binder composition mixed by the stirring shaft 4 can be captured directly by the conveying device 5 and can be conveyed out of the drum 2 through the outlet 7.

The conveying device 5 in this illustration is configured as a screw conveyor. The screw conveyor in this illustration has two complete turns 9. Depending on the desired conveying rate, the screw conveyor may have different dimensioning and/or a different configuration. The conveying device 5 and the stirring shaft 4 are arranged on one and the same axis in the drum 2. In this illustration, the stirring shaft 4 is equipped with pegs 8, so that the hydrous binder composition in the drum is moved by the pegs 8 on rotation of the stirring shaft.

In this illustration there are two inlets 6 arranged on the drum 2. In an alternative variant, not illustrated, however, the drum 2 has only one inlet. In that case, the components to be mixed may already be combined before they are conveyed via the inlet into the drum 2.

Mixers of this kind are especially suitable for rapid and homogeneous mixing of the aqueous accelerator with the hydrous mineral binder composition.

Preference is given to a mixer 1 which additionally comprises a drive 3, and for the dynamic mixing element to comprise a stirring shaft 4 having stirring elements 8, for mixing the hydrous mineral binder composition with the aqueous accelerator, the mixing region 10 and the conveying region 11 being arranged in one and the same drum 2.

The stirring shaft 4 and the conveying device 5 are preferably arranged on one and the same axis, with the conveying device 5 more particularly comprising a screw conveyor.

The invention claimed is:

1. A method for applying a mineral binder composition by 3D printing, comprising the steps of
providing a hydrous mineral binder composition,
feeding the hydrous mineral binder composition to a continuous mixer comprising
a mixing region with at least one dynamic mixing element and at least one inlet,
a conveying region connected to the mixing region and comprising at least one conveying device and an outlet,
the hydrous mineral binder composition being conveyed through the at least one inlet into the mixing region,
feeding at least one aqueous accelerator for the setting of the hydrous mineral binder composition into the mixing region of the continuous mixer,
mixing the at least one aqueous accelerator with the hydrous binder composition in the mixing region of the continuous mixer to give an accelerated binder composition,
conveying the accelerated binder composition by the conveying device to the outlet, and
applying the accelerated binder composition layer by layer.

2. The method as claimed in claim 1, wherein the hydrous mineral binder composition comprises at least one hydraulic binder.

3. The method as claimed in claim 2, wherein the hydraulic binder is selected from the group consisting of Portland cement, calcium aluminate cement, calcium sulfoaluminate cement, and mixtures thereof.

4. The method as claimed in claim 1, wherein the mineral binder composition comprises fillers of which at least 30 wt % are smaller than 2 mm, based on a total amount of 100 wt % of all fillers in the binder composition.

5. The method as claimed in claim 1, wherein the hydrous mineral binder composition is a fresh mortar having a slump of at least 170 mm, determined according to DIN EN 1015-3 after the raising of the slump cone without lifts of the flow table.

6. The method as claimed in claim 1, wherein the aqueous accelerator comprises at least one compound selected from the group consisting of amino alcohols, alkali metal and alkaline earth metal nitrates, alkali metal and alkaline earth metal nitrites, alkali metal and alkaline earth metal thiocyanates, alkali metal and alkaline earth metal halides, alkali metal and alkaline earth metal carbonates, glycerol, glycerol derivatives, glycols, glycol derivatives, aluminum salts, aluminum hydroxides, alkali metal and alkaline earth metal hydroxides, alkali metal and alkaline earth metal silicates, alkali metal and alkaline earth metal oxides, crystallization nuclei, and mixtures thereof.

7. The method as claimed in claim 1, wherein the aqueous accelerator comprises an aluminum salt or aluminum hydroxide, or mixtures thereof.

8. The method as claimed in claim 1, wherein the aqueous accelerator is metered in an amount in the range from 0.3 to 8 parts by weight, calculated as solid without water, based on 100 parts by weight of mineral binder.

9. The method as claimed in claim 1, wherein the continuous mixer is mounted on a movable printing head.

10. The method as claimed in claim 1, wherein the mixer further comprises a drive, and in that the dynamic mixing element comprises a stirring shaft having stirring elements, for mixing the hydrous mineral binder composition with the aqueous accelerator, the mixing region and the conveying region being arranged in one and the same drum.

11. The method as claimed in claim 10, wherein the stirring shaft and the conveying device are arranged on one and the same axis.

12. The method as claimed in claim 1, wherein the hydrous mineral binder composition is mixed with the aqueous accelerator in the mixing region at a stirring shaft speed of 500 to 3000 revolutions per minute.

13. An accelerated binder composition obtained from a method as claimed in claim 1, wherein immediately after the mixing of the hydrous mineral binder composition with the aqueous accelerator, the composition for at least 10 seconds has a penetrometer resistance of not more than 0.03 MPa, and after at most 10 minutes has a penetrometer resistance of more than 0.03 MPa, the penetrometer resistance being determined at 21° C. with a penetrometer according to ASTM C-403 with a needle of 1 mm diameter.

14. The accelerated binder composition as claimed in claim 13, wherein, after provision and application thereof at 21° C., the composition 8 hours after mixing with the aqueous accelerator has a compressive strength of at least 10 MPa, the compressive strength being determined according to EN 196-1.

15. The method as claimed in claim 1, wherein the mixing region of the continuous mixer includes at least two inlets, and the hydrous mineral binder composition is conveyed through one of the at least two inlets into the mixing region, and the aqueous accelerator is conveyed through another of the at least two inlets into the mixing region.

16. The method as claimed in claim 15, wherein the continuous mixer comprises a drum that includes the mixing region and the conveying region, the mixing region including a stirring shaft that is driven by a drive, the stirring shaft mixing the mixing the aqueous accelerator with the hydrous mineral binder composition to provide the accelerated binder composition, and the conveying region being arranged to directly adjoin the stirring shaft such that the accelerated binder composition is directed captured from the stirring shaft by the conveying device and is then conveyed out of the drum through the outlet.

\* \* \* \* \*